(12) United States Patent
Kahrizi et al.

(10) Patent No.: US 9,356,711 B2
(45) Date of Patent: May 31, 2016

(54) SELF-CALIBRATION TECHNIQUE FOR CARRIER AGGREGATION RECEIVERS

(71) Applicant: BROADCOM CORPORATION, Irvine, CA (US)

(72) Inventors: Masoud Kahrizi, Irvine, CA (US); Bernd Pregardier, Oceanside, CA (US)

(73) Assignee: Broadcom Corporation, Irvine, CA (US)

( * ) Notice: Subject to any disclaimer, the term of this patent is extended or adjusted under 35 U.S.C. 154(b) by 187 days.

(21) Appl. No.: 14/281,512

(22) Filed: May 19, 2014

(65) Prior Publication Data

US 2015/0288467 A1 Oct. 8, 2015

Related U.S. Application Data

(60) Provisional application No. 61/976,401, filed on Apr. 7, 2014.

(51) Int. Cl.
*H04J 1/16* (2006.01)
*H04B 17/21* (2015.01)

(52) U.S. Cl.
CPC ................................ *H04B 17/21* (2015.01)

(58) Field of Classification Search
None
See application file for complete search history.

(56) References Cited

U.S. PATENT DOCUMENTS

| | | | |
|---|---|---|---|
| 2011/0246808 A1* | 10/2011 | Kerth | H04W 52/028 713/340 |
| 2013/0265892 A1* | 10/2013 | Fernando | H04L 5/001 370/252 |
| 2015/0070207 A1* | 3/2015 | Millar | G01S 13/006 342/174 |
| 2015/0111504 A1* | 4/2015 | Zhang | H01Q 1/246 455/67.11 |

OTHER PUBLICATIONS

Hadji-Abdolhamid, et al., Receiver for Carrier Aggregation, U.S. Appl. No. 14/066,830, filed Oct. 30, 2013.
Kahrizi et al., Flexible Receiver Architecture for Multiple Component Carrier Aggregation in Down Link, U.S. Appl. No. 14/087,269, filed Nov. 22, 2013.

* cited by examiner

*Primary Examiner* — Kibrom T Hailu
(74) *Attorney, Agent, or Firm* — Garlick & Markison; Bruce E. Garlick

(57) ABSTRACT

A technique to provide calibration in a receiver that receives multiple carriers and uses multiple receive signal paths to down-convert and process the multiple carrier signals.

20 Claims, 6 Drawing Sheets

SELF-CALIBRATION TECHNIQUE FOR CARRIER AGGREGATION RECEIVERS

CROSS REFERENCE TO RELATED APPLICATIONS/INCORPORATION BY REFERENCE

The present U.S. Utility patent application claims priority pursuant to 35 U.S.C. §119(e) U.S. Provisional Patent Application No. 61/976,401, entitled "Self-Calibration Technique for Carrier Aggregation Receivers," filed Apr. 7, 2014, which is hereby incorporated herein by reference in its entirety and made part of the present U.S. Utility patent application for all purposes.

Furthermore, the present application is related to U.S. Utility patent application Ser. No. 14/087,269, entitled "Flexible Receiver Architecture for Multiple Component Carrier Aggregation in Down Link," filed Nov. 22, 2013, which is also incorporated herein by reference in its entirety for all purposes.

BACKGROUND

1. Technical Field

The embodiments of the present disclosure relate to wireless communications and, more particularly, to a calibration technique to be applied to wireless receivers that receive transmissions of multiple carrier signals in down link communications.

2. Description of Related Art

In the mobile communication area, various systems are being implemented throughout the world to increase the amount of voice and data traffic that can be carried over the air to wireless devices. These systems include universal mobile telecommunications system (UMTS), advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), as well as others. One recent development is Long Term Evolution (LTE), which uses a standard developed under the $3^{rd}$ Generation Partnership Project (3GPP or 3G) and is marketed as 4G communications technology.

As more constraints are placed on mobile network operators to provide improved data throughput and quality of services, new techniques are constantly being sought to provide such improvements or new developments. Network operators are looking to offer more attractive and distinctive services to enhance the end user experience, while device (e.g. phone) manufacturers and chipset vendors are competing to create highly desirable mobile devices and applications. One way to achieve an increase in downstream data rates is to increase the bandwidth of the down link communication.

One recent technique is the use of multiple transmission paths between a transmitter and a receiver. Commonly referred to as Multiple-Input/Multiple-Out (MIMO) communications, substantially simultaneous transmissions of data over multiple paths permit more data throughput between two or more devices. Typically in a MIMO device, multiple antennas are employed to transmit and receive multiple channels. Time and/or spatial diversity (including antenna diversity) may be employed to obtain the MIMO transmission. However, for MIMO transmitters, the radio front end typically requires multiple transmission paths and associated components to transmit multiple channels simultaneously. Likewise, for a MIMO receiver, the radio front end also requires multiple receiving paths and associated components to receive multiple channels simultaneously.

Furthermore, a new technique is currently being developed utilizing the LTE standard, in which the down link bandwidth is increased via so-called carrier aggregation. For example, Release 10 under the current LTE standard and in a move toward the LTE-Advanced standard, specifies that radio frequency (RF) carriers from one or multiple base stations (Node B) may be aggregated and jointly used for transmissions to/from a single terminal. That is, instead of a single RF carrier being transmitted from a node (such as a cell tower, Node B, etc.) to a mobile device, the new LTE standard allows multiple carriers from one or multiple nodes to be sent down link to a single terminal. Because the use of multiple carriers increases the bandwidth of the transmitted signal, down link data rates to a user terminal or user equipment (UE) may be increased as well using this technique.

For a multi-path receiver receiving multiple carriers, significantly more components are now present in a radio receiver for receiving and processing multiple carriers. A self-calibration routine in a radio receiver is now further complicated by the presence of multiple processing paths in the receiver. Although these complexities in calibration may be dealt with at the factory during initial factory calibration, a self-calibration technique in the field during actual usage of the radio device (e.g. use by a consumer) usually relies on on-chip circuitry and routines present in the device. Whereas a single calibration circuitry may be employed in single path receivers, such circuitry, if duplicated for each path in a multiple carrier receiver, may present significant additional constraints that may be undesirable.

Accordingly, one solution is to find a more robust and/or efficient self-calibration technique to be implemented for multiple carrier receivers.

DETAILED DESCRIPTION

The embodiments described below may be practiced in a variety of communication networks that utilize wireless technology to communicate between a transmission source or sources and a receiving device utilizing one or more communication protocols to transfer voice, video, data and/or other types of information. The particular technology described below pertains to Long Term Evolution (LTE) or $4^{th}$ Generation (4G) communication standards as applied to telephone (for example, cellular) devices. However, other embodiments need not be limited to LTE or 4G. Thus, GSM/EDGE, CDMA, Wide-CDMA (W-CDMA), Time Division Synchronous CDMA (TD-CDMA) communication techniques are applicable for use with the described embodiments or other embodiments. The component carrier aggregation allows for applications of both Frequency Division Duplexing (FDD) and Time Division Duplexing (TDD) schemes.

In particular, the multiple component carrier aggregation described herein pertains to an advancement of LTE toward LTE-Advanced and as specified in Release 10 (or subsequent Releases for LTE), but various embodiments may be applicable to other standards or protocols as well. Also, the particular embodiments described herein address the processing of up to three component carriers that are aggregated in a signal to a receiving terminal, such as a User Terminal (UE) in a cellular network, but other embodiments may service more component carriers, as well as utilize various other receiving devices. The self-calibration technique described herein is applicable to receivers employing multiple receive signal paths to process multiple channels and/or carriers, whether component carrier aggregation, diversity, or some other technique is used. Likewise, the communication may be MIMO or some other scheme that employs multiple receive signal paths.

Figure 1:
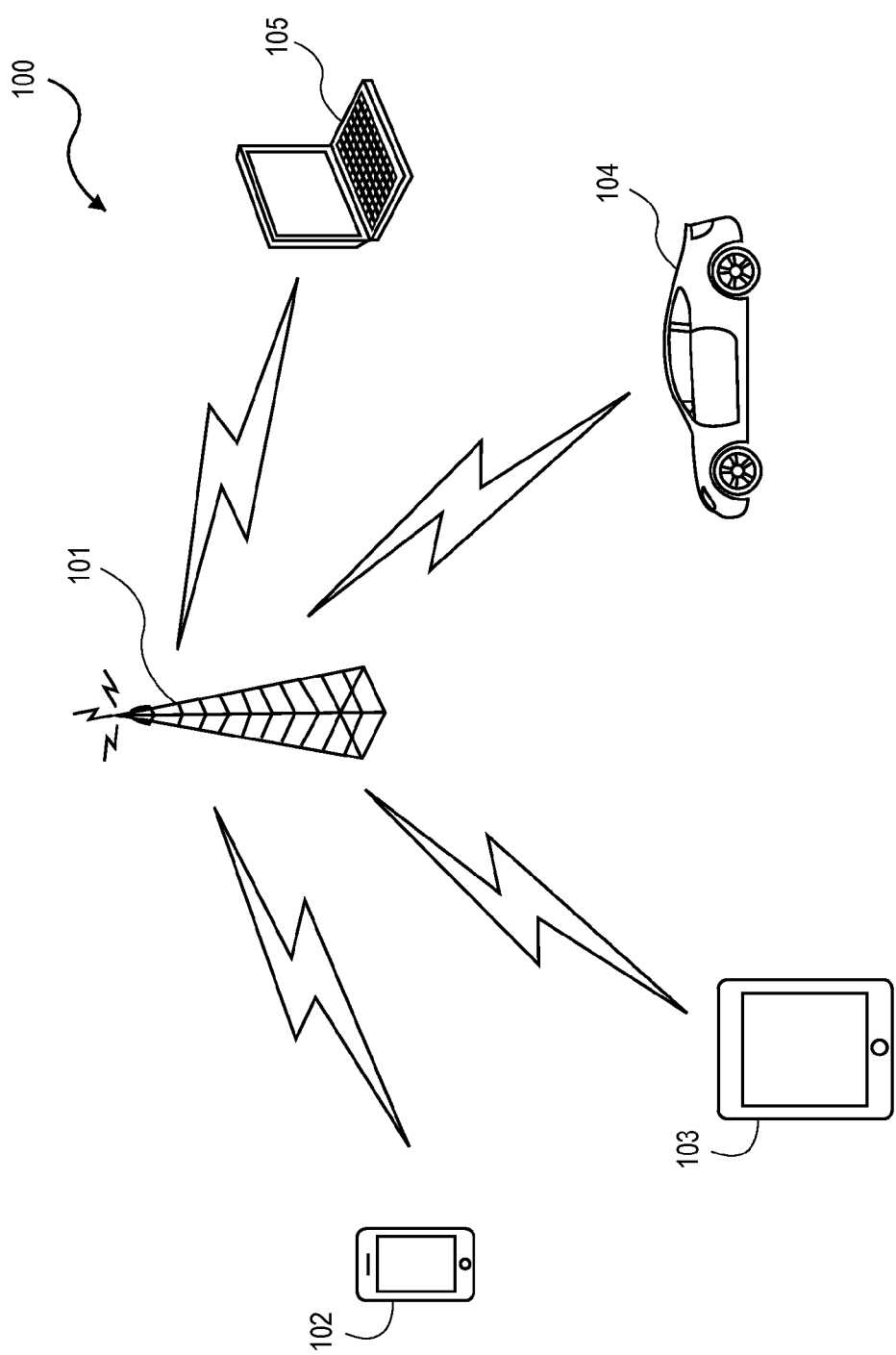
FIG. 1 shows a system diagram of an example wireless communication network connecting a number of different mobile devices to a transmitting node that transmits a multiple carrier signals in accordance with the present disclosure.

FIG. 1 shows a system diagram of an example wireless communication network connecting a number of different mobile devices to a transmitting node that transmits multiple carrier signals. The multiple carriers may be component carriers or carriers used for diversity communication. In FIG. 1, a system 100 is shown that includes a variety of receiving devices 102-105 configured to operate within a network having a down-link transmitting source 101. In the example system 100, transmitting source 101 is a cellular communication node, commonly referred to as a base station or Node B. However, transmitting source 101 need not be limited to cellular communication. Other embodiments may employ different communication technology from different wireless transmitting sources. Furthermore, instead of a single transmitting source 101, multiple transmitting sources 101 may be used for transmission of the multiple carriers, wherein a respective one of the multiple transmitting sources transmits one or more carrier(s) that comprise the aggregated signal sent to a receiver.

In the particular example for system 100, device 102 is a mobile phone (e.g. cell phone, smartphone, etc.), device 103 is a tablet computer with wireless phone capability, device 104 is a device affixed in a vehicle (e.g. a communication device or GPS navigation system with dual communication link), and device 105 is a notebook computer or a personal computer (PC) with wireless phone capability. It is to be noted that other types of devices may be present within system 100.

Devices 102-105, which are sometimes referred to as UEs, communicate with transmission source 101 utilizing one or more communication protocols and/or standards. As noted above, the network of system 100 may use LTE or 4G communication standard/protocol to transmit voice, audio, video, data, etc. from transmitting source 101 to receivers of devices 102-105. In one embodiment, the transmitted signal from transmitting source 101 carries multiple component carrier signals that are aggregated and directed to one of the devices 102-105. Release 10 of the LTE standard permits up to five such component carrier signals to be aggregated. That is, from Release 10 onward, the transmission bandwidth may be extended by means of the so-called Carrier Aggregation (CA) technique, where multiple radio frequency (RF) carriers are aggregated and jointly, or substantially simultaneously, transmitted to a single terminal. This carrier aggregation increases the bandwidth to increase the down link data rate to a user at the receiving terminal. The receiver receiving the multiple component carrier signals processes the different component carrier signals separately and aggregates the processed components to recover the information contained in the multiple component carrier signals.

Thus, for one embodiment of system 100, the wireless link implements component carrier aggregation in transmitting an RF signal from source 101 (or a plurality of sources 101) to devices 102-105. In one of the descriptions below, a scenario illustrates the use of up to three such component carrier signals that are aggregated. The transmitted signal from source (s) 101 to respective devices 102-105 may have one, two or three component carrier signals. Depending on the order of allocation in the network, the three component carriers are referred to as Primary Component Carrier (PCC), Secondary Component Carrier (SCC) and Tertiary Component Carrier (TCC). When only one component carrier is present, only the PCC is used. When two component carriers are present, the carriers are PCC and SCC. When all three are present, the carriers are PCC, SCC and TCC.

Although a single transmitting source 101 is illustrated in FIG. 1, the component carrier signals may be transmitted from multiple transmitting sources. Accordingly, PCC may be transmitted from a first transmitting source, SCC from a second transmitting source and TCC from a third transmitting source. Likewise, one component carrier may be transmitted from one transmitting source, while two others may be transmitted from a second transmitting source. Other combinations are possible for transmitting component carriers from multiple transmitting sources. It is to be noted that the different component carrier signals may be respectively transmitted from one or a plurality of transmitting sources.

Depending on the network, which may depend on the geographic location of the network, the various RF frequency bands and carrier frequency allocations for the network may differ. In some networks, the network frequency allocation allows for two or more carriers to be in the same range of frequencies allocated as a particular band (e.g. frequency band) so that the multiple component carriers reside within the same allocated band (intra-band), whereas in other applications, one or more carriers reside in different allocated frequency bands (inter-band).

When two or more component carriers are allocated within the same allocated frequency band, the CA may be contiguous or non-contiguous. In Contiguous Carrier Aggregation (CCA), component carriers are located in adjacent channels. For example, with two contiguous component carriers, a first channel having a bandwidth (BW) of 20 MHz may be combined with an adjacent channel (having 20 MHz BW) to effectively provide a super BW channel of 40 MHz. Non- Contiguous Carrier Aggregation (NCCA) uses carriers that are located in the same allocated band, but in non-adjacent channels.

Figure 2:
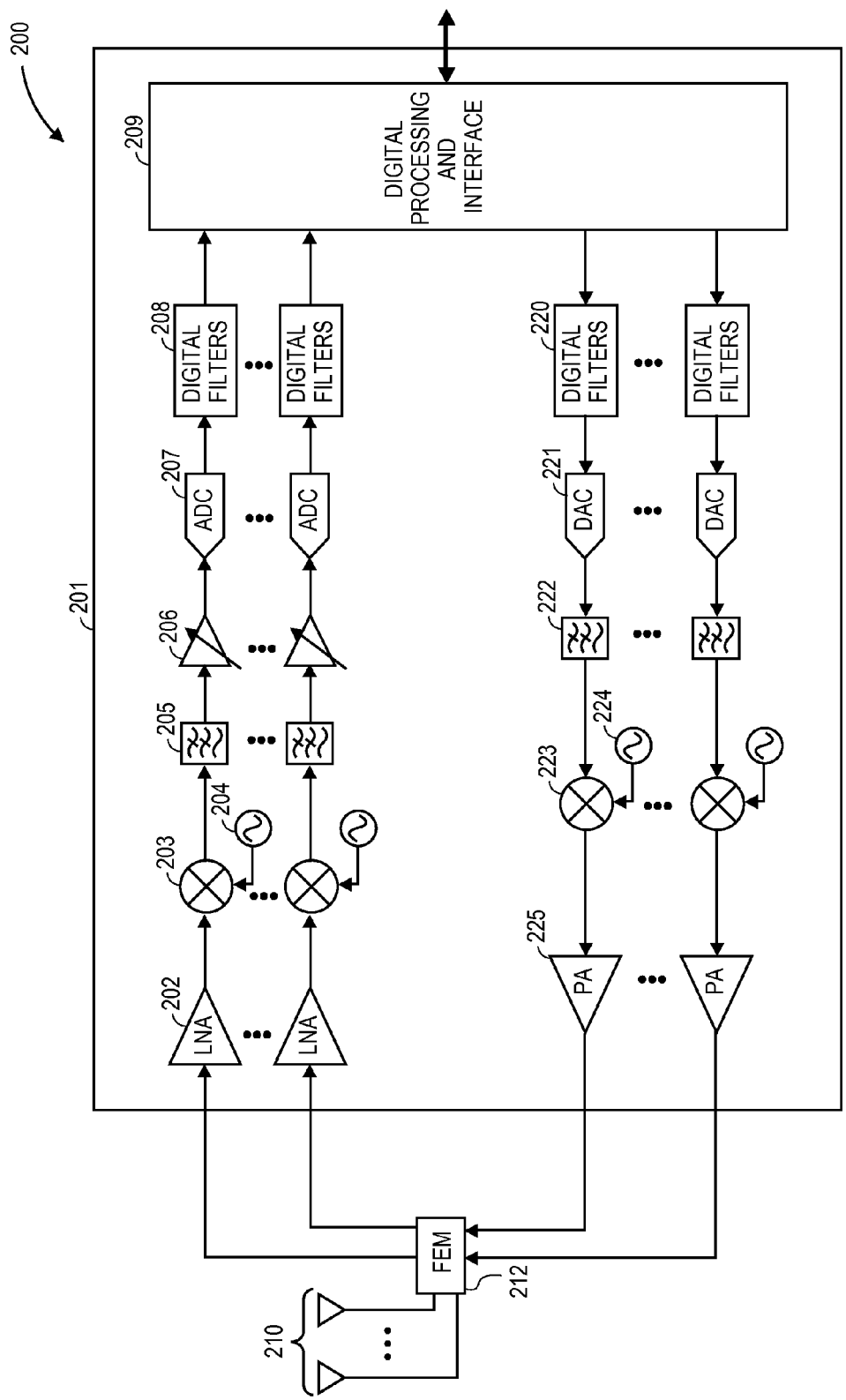
FIG. 2 shows a system block diagram of an example transceiver for a wireless communication device that receives RF signals carrying multiple carrier signals, as well as having the capability to transmit multiple carriers in accordance with the present disclosure.

FIG. 2 shows a system block diagram of an example transceiver for a wireless communication device that receives RF signals carrying multiple carrier signals, as well as having the capability to transmit multiple carriers. In FIG. 2, a transceiver 200 includes a radio portion 201 that has a plurality of receive signal paths and a plurality of transmit signal paths. The particular transceiver 200 may be included within one or more of devices 102-105 of FIG. 1. Transceiver 200 includes one or more antenna(s) 210 for coupling through a RF front-end module (FEM) 212 (that may contain components such as antenna switches, duplexers, diplexers, couplers, etc.) for feeding signals from the transmission signal path to the antennas and feeding received signals to one or more receive signal paths. It is to be noted that a variety of devices inside FEM 212 may be used to switch and/or couple transmission signals to and received signals from antennas 210. FEM 212 may be constructed as an integrated component, discrete component or a combination of both. Furthermore, a variety of antennas may be employed for antennas 210. In one embodiment, antennas 210 may be part of an antenna array, such as antenna arrays constructed on integrated circuits.

FEM 212 may also include one or more filtering modules/stages/network/assembly (referred herein simply as input filters) configured to filter the incoming signal or signals to a designated or selected one of the receive paths. Such input filters may be stand-alone filters or the filters could be a component part of the receiver, such as a filter portion of duplexers that support full duplex (FDD) operations for the radio transceiver. What is to be noted is that some filtering operation is performed to filter the incoming RF signal containing multiple carrier signals and this filtering operation directs the different carriers (e.g. component carriers for carrier aggregation) into one or more separate input paths based on the frequency of the respective carrier. Furthermore, the afore-mentioned U.S. Utility patent application Ser. No. 14/087,269, entitled "Flexible Receiver Architecture for Multiple Component Carrier Aggregation in Down Link," filed Nov. 22, 2013 and incorporated by reference herein, describes examples of front-ends which may be employed within FEM 212.

A respective receive signal path includes a low noise amplifier (LNA) 202, mixer 203, analog filter(s) 205, variable gain amplifier 206, analog-to-digital converter (DAC) 207 and digital filter(s) 208. A local oscillator (LO) 204 provides a local oscillator frequency to its respective mixer 203. Generally, a local oscillator uses a phase-locked-loop (PLL) circuitry, in which the PLL scheme allows for tightly controlled frequencies for generating the LO signal. Only two receive signal paths are shown in FIG. 1, but other embodiments may have more such receive paths. A respective receive signal path provides for down-conversion of a received signal by mixer 203, puts into digital format by ADC 207 and filters 208 for digital processing.

The outputs from digital filters 208 are digital signals and these digital signals are coupled to digital processing and interface module 209. Module 209 may incorporate a variety of hardware and/or software to process the digital signals. In some embodiment a digital signal processor (DSP) may be included as part of module 209. The processed digital signals from module 209 may then be coupled to a baseband processing or operating unit, which may be part of an integrated circuit that contains radio 201, or the baseband processing or operating unit may be on a separate integrated circuit. In one embodiment, the baseband processing or operating unit may be included as part of module 209.

Likewise, the transmission side of radio 201 includes one or more transmission signal path(s). A respective transmission signal path includes digital filter(s) 220, digital-to-analog converter (DAC) 221, analog filter(s) 222, mixer 223, with its respective local oscillator 224, and power amplifier (PA) 225. Outgoing baseband signals are processed by digital processing and interface module 209 and sent to a selected one of the transmission signal paths, wherein the digital signal is put into analog format by DAC 221 for up-conversion by mixer 223 and transmitted from antennas 210 via FEM 212.

It is to be further noted that a variety of radio front-ends may be used, instead of FEM 212 shown in FIG. 2. Various switches, diplexers, duplexers, wave guides, transmission lines, etc. may be used with FEM 212. Likewise, FEM 212 may employ a variety of filters. In one embodiment, the radio front-end uses Surface Acoustic Wave (SAW) filters to designate a pass band to pass a selected range of frequencies through the respective input filters of FEM 212. The filters may also provide for a particular implementation based on network usage or requirements. For example, the component carriers being received for carrier aggregation may all have the same bandwidth, or different bands or channels may have different bandwidths. In one application, the component carriers being transmitted may have a bandwidth of 1.4, 3, 5, 10, 15 or 20 MHz per carrier. Depending on the particular usage, a receiving device utilizes filters to accommodate not only the transmitted frequency (or frequency band), but also the allocated bandwidth requirements for individual component carriers being utilized for the particular network.

In one embodiment, a respective one of the input filters is designed to filter carriers that fall within a certain frequency range (e.g. filter bands) and the filters are further grouped into filter groupings to provide respective frequency band groupings (e.g. grouping of frequency bands). It is to be noted that the filter groupings may coincide with an allocated frequency spectrum for a given network or the grouping of the filters may be independent of such standard based frequency spectrum allocations.

Input filters may be included within the radio. However, in a typical implementation, a chip vendor supplies the radio integrated circuit and a device manufacturer (e.g. phone OEM) designs the filter front-end (e.g. FEM 212) for the device. Accordingly, the embodiment of FIG. 2 exemplifies this practice by showing FEM 212 as residing outside of the integrated circuit that contains radio portion 201.

Figure 3:
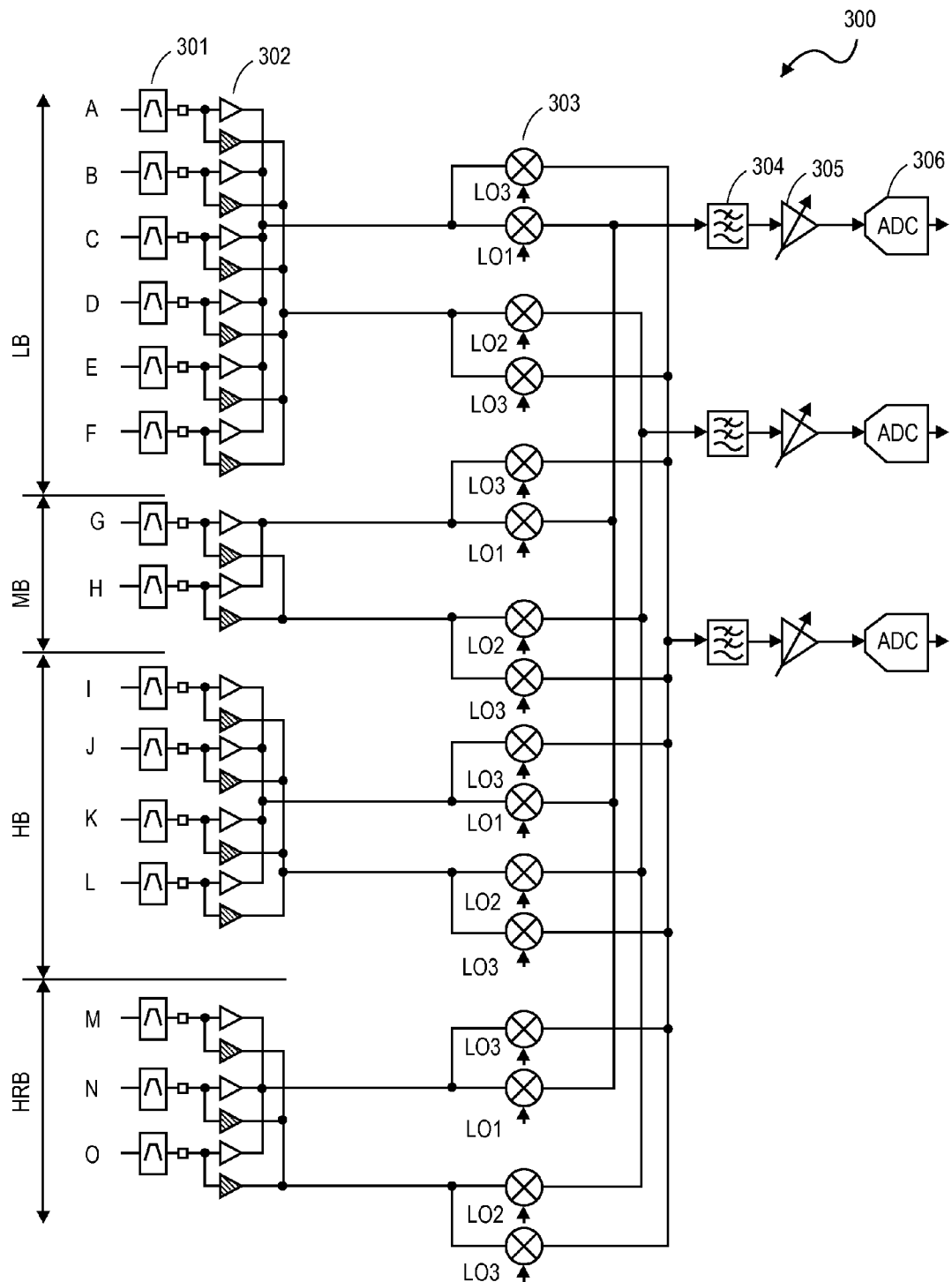
FIG. 3 shows a circuit diagram of an example receiver portion that processes three component carrier signals used in carrier aggregation that may be received across a number of frequency bands over four frequency band groupings, in which four mixers are used with a respective frequency band grouping for a total of sixteen mixers in accordance with the present disclosure.

FIG. 3 shows a circuit diagram of an example receiver portion that processes three component carrier signals used in carrier aggregation that may be received across a number of frequency bands over four frequency band groupings, in which four mixers are used with a respective frequency band grouping for a total of sixteen mixers. The number of frequency band groupings and the partitioning of such groupings depend on platform requirements and may be differently arranged then shown. In FIG. 3, a receiver 300 shows fifteen inputs to fifteen filters 301, in which the inputs are respectively noted as A-O. Receiver 300, except for the filters 301, may be included as part of radio portion 201 of FIG. 2, in which instance filters 301 are equivalent to input filters of FEM 212.

Furthermore, filters 301 are grouped into the four frequency band groupings (or groups), designated as Low Band (LB), Mid-Band (MB), High Band (HB) and Higher Band (HRB). The filter grouping allocation shown is 6-2-4-3 for LB-MB-HB-HRB, to correspond to the inputs A-O. The frequency band groupings LB, MB, HB and HRB may be based on frequency spectrum allocation for a network, network standard, some other requirement or it may be arbitrary set. The frequency band grouping is not limited to four groupings and other embodiments may have less or more number of band groupings. What is to be noted is that filters of a particular band grouping pass signals of a selected frequency range (bandwidth) that fits within the designated spectrum set for that filter grouping. As noted above, the afore-mentioned U.S. Utility patent application Ser. No. 14/087,269, entitled "Flexible Receiver Architecture for Multiple Component Carrier Aggregation in Down Link," filed Nov. 22, 2013, describes embodiments for such frequency band groupings.

For example, in one embodiment, the following frequency allocation is used:

| LB  | 600-1000 MHz  | Inputs A-F |
| MB  | 1400-2000 MHz | Inputs G & H |
| HB  | 1800-2200 MHz | Inputs I-L |
| HRB | 2300-2600 MHz | Inputs M-O |

Thus, for example, the six filters (shown having inputs A-F) of band grouping LB are configured to respectively pass different frequency bands that fit within 600-1000 MHz. Filters 301 may all have the same bandwidth characteristics or some (or all) may have different bandwidth characteristics. The component carriers being transmitted for carrier aggregation may have a bandwidth of 1.4, 3, 5, 10, 15 or 20 MHz per carrier in one embodiment, so that the filter bandwidths of the lowpass-filters 304 may be selected based on these values. The actual number of filters 301 used per band grouping, as well as the band-pass setting for each filter, are design factors to allow for the filtering of the different carrier signal that are received by the receiver. Note that the number of filters shown in FIG. 3 is presented for exemplary purpose and actual devices may have the same, less or more such filters and filter arrangements.

A particular component carrier received at the antenna is filtered by one of the filters 301 based on its frequency. For inter-band carrier aggregation cases, three component carriers would be passed through three different filters based on the carrier frequencies. For any intra-band carrier aggregation cases, the intra-band carriers would be filtered through the same (common) filter. Respective filter outputs are coupled to a pair of LNAs 302, in which a filter output is coupled to a first set of LNAs (shown in lighter color) and also to a second set of LNAs (shown in darker color). This is done separately for each respective band grouping. The LNA outputs from the first set of LNAs for a particular band grouping are combined together and the outputs from the second set of LNAs for that particular band grouping are combined together. This is also done for the respective band groupings.

The first set of LNA outputs are coupled to a first mixer having LO1 as the LO frequency and to a second mixer having LO3 as the LO frequency. The second set of LNA outputs are coupled to a third mixer having LO2 as the LO frequency and to a fourth mixer having LO3 as the LO frequency. This arrangement is also done for the respective filter band groupings. When only one carrier is received, only one mixer and one LO signal is used. When two component carriers are received, two mixers and two different LO signals are used. When three carriers are received, three mixers and three different LO signals are used.

The outputs from the mixers 303 are coupled to respective filters 304, amplifier 305 and ADC 306. The output of the ADC is in digital format and subsequently sent down the receive chain as illustrated in FIG. 2.

A control mechanism is used to activate (or switch in) only one mixer per signal path, so that either LO1 or LO3 is used to down-convert the first set of LNA outputs and either LO2 or LO3 is used to down-convert the second set of LNA outputs. The outputs from mixers utilizing LO1 are coupled to provide the down-converted output. The outputs from mixers utilizing LO2 are coupled to provide the down-converted output and the outputs from mixers utilizing LO3 are coupled to provide the down-converted output. Those mixers 303 and respective components of that receive signal path may be made inactive.

Thus, the particular implementation of receiver 300 allows for three component carriers to be processed in the receiver, in which two of the component carriers may be intra-band carriers. With the two intra-band component carriers, the two intra-band component carriers would be both filtered by a common filter and then the filtered output provided to the two LNA input paths for that filter (a path for each of the two intra-band component carriers). A mixer corresponding to the one path down-converts the first filtered component carrier signal and a different mixer corresponding to the second path down-converts the second filtered component carrier signal. The third component carrier is in a different band grouping. Only two intra-band carriers are capable of being processed in a given band grouping when the band groupings having two LNA paths.

It is to be noted that other embodiments may readily implement a third (or more) LNA path per radio frequency (RF) input at each filter to provide for a third down-conversion path for a third (or more) carrier in the same frequency band grouping. However, such a third path may add considerable number of LNAs and mixers, as well as other components (e.g. control circuitry, switches, etc.), so that there may be a trade-off on whether it is desirable to process a third intra-band component carrier.

The embodiment of FIG. 3 provides flexibility to handle up to three component carrier signals by utilizing two input paths per RF input at the respective filters without overburdening the circuitry. The two LNA input signal paths per filter allows for two filtered component carrier signals to be processed, whether the two carrier signals are intra-band (passing through the same filter) or inter-band (passing through two different filters). Because the LNA outputs are combined only for a particular frequency band grouping, the third component carrier signal may be processed by a filter and one of the LNA input path of a different frequency band grouping. The number of substantially simultaneous component carrier signals that may be processed for a band grouping is dependent on the number of the LNA input paths per band grouping and the total number of the component carriers that may be aggregated is limited by the number of BBs available.

Accordingly, receiver 300 allows for the substantially simultaneous processing of up to three component carrier signals, in which:

all three component carriers are in different frequency band groupings (all inter-band);

two component carriers are in one frequency band grouping, but filtered using different filters, and the third component carrier is in a different frequency band grouping (all are inter-band); and two component carriers are in one frequency band grouping and filtered using the same filter (intra-band), and the third component carrier is in a different frequency band grouping (inter-band).

It is to be noted that in some instances, where the two intra-band component carrier signals are contiguous (CCA), the same filter and the same LNA path may be capable of processing the two CCA carriers, since the two carriers' bandwidths are contiguous.

It is also to be noted that the receive paths show one mixer for ease of explanation. However, in actual practice there are two complementary mixers, one for processing the In-phase (I) component of a signal and the other to process the Quadrature (Q) component of the signal.

Figure 4:
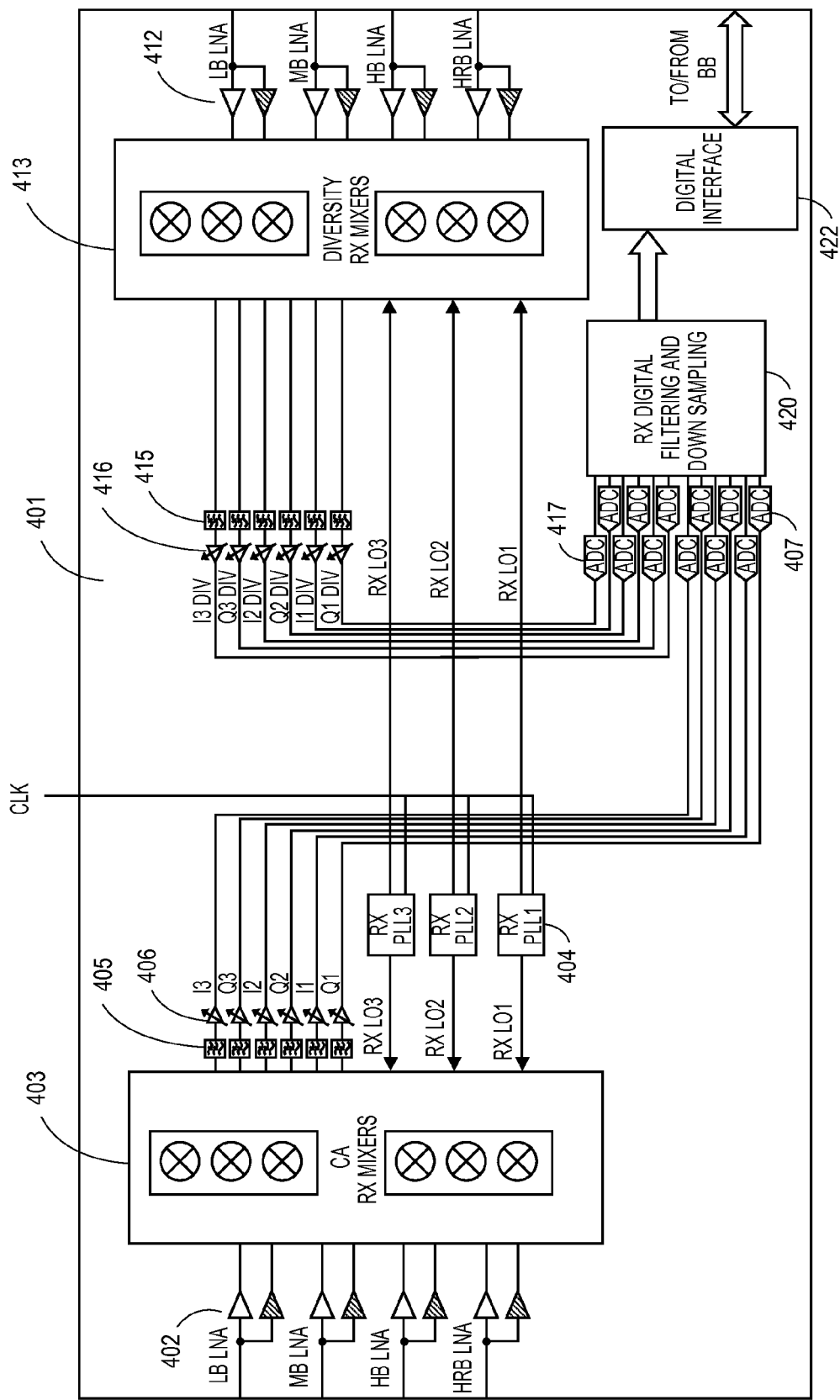
FIG. 4 shows a system block diagram of an example receiver for a wireless communication device that receives RF signals carrying multiple carrier signals, either by diversity or by carrier aggregation, or by a combination of both, in accordance with the present disclosure.

FIG. 4 shows a system block diagram of an example receiver for a wireless communication device that receives RF signals carrying multiple carrier signals, either by diversity or by carrier aggregation or by a combination of both. Radio receiver portion 401 is equivalent to the receiver side of radio portion 201 of FIG. 2, but utilizing the 3 LO configuration of FIG. 3. Furthermore, radio receiver portion 401 has receive signal paths for receiving component carriers for carrier aggregation, as well as receive signal paths for receiving multiple carriers for diversity communication. The carrier aggregation signals are received and down-converted via LNAs 402, mixers 403, analog filters 405, variable gain amplifiers 406, ADCs 407, and the resulting digital signal output processed by receiver (RX) digital filtering and down sampling module 420. Three RX PLLs 404 function as local oscillators to provide respective local oscillator signals to mixer 403.

Likewise, diversity carrier signals are down-converted via a separate receive signal path via LNAs 412, mixers 413, analog filters 415, variable gain amplifiers 416, ADCs 417, and the resulting digital signal output processed by RX digital filtering and down sampling module 420. PLLs 404 also function as local oscillators to provide respective local oscillator signals to mixer 413. The digital output from RX digital filtering and down sampling module 420 is provided to digital interface 422 for coupling to baseband processing or operating unit, as noted in the description pertaining to FIG. 2, if those functions are not present within module 420. Thus, the embodiment of FIG. 4 incorporates separate circuitry for receiving component carriers for carrier aggregation and/or multiple carriers for diversity reception, whether time or spatial diversity (including antenna diversity). Note that I and Q paths are noted in FIG. 4 for processing the I component of a signal and the Q component of the signal.

As will be noted, the self-calibration technique described below may be utilized with either the component carrier reception on the main receiver path of mixers 403 or the diversity receiver path of mixers 413. In either event, the described self-calibration technique is used to test one receive signal path by introducing a calibration signal on a second receive signal path.

Figure 5:
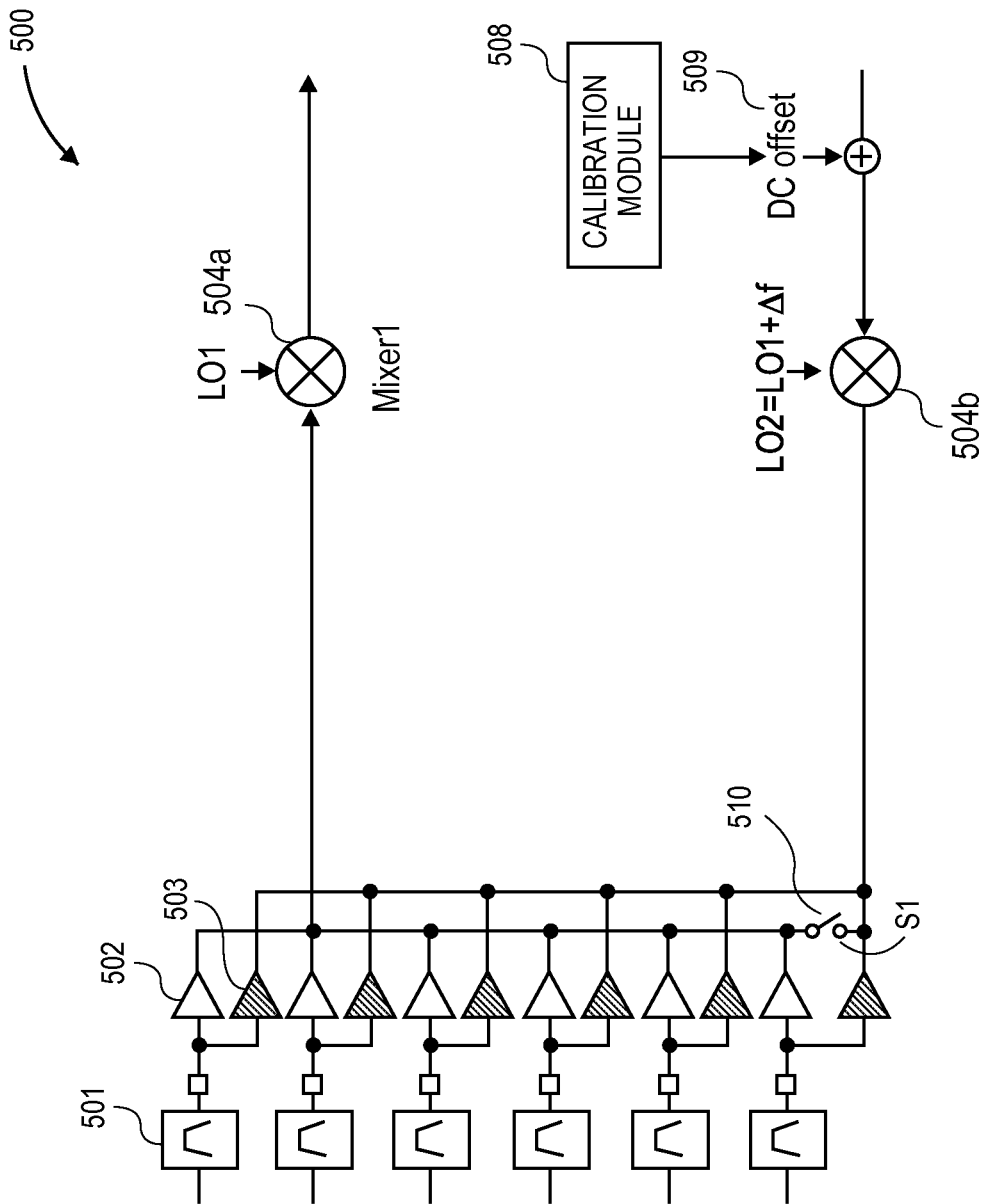
FIG. 5 shows a circuit diagram of an example receiver portion having multiple receive signal paths, in which a calibration module introduces a calibration signal in one receive signal path for coupling to a second receive signal path to calibrate the second receive signal path, in accordance with the present disclosure.

FIG. 5 shows a circuit diagram of an example receiver portion 500 having multiple receive signal paths, in which a calibration module introduces a calibration signal in one receive signal path for coupling to a second receive signal path to calibrate the second receive signal path. Note that the two receive signal paths may be any two paths that emanate from a particular filter 501 or a set of filters. In FIGS. 3 and 4, an output from a particular input filter is coupled to a pair of LNAs (302, 402 and 412). The corresponding pair of LNAs were than coupled to two separate receive paths having two separate mixers and LOs, as was illustrated in FIG. 3. Accordingly, for FIG. 5, a particular input filter 501 is shown providing input to a pair of LNAs 502, 503. For a particular filter grouping, output nodes of LNAs 502 (shown without shading) are coupled to mixer 504a and output nodes of LNAs 503 (shown with shading) are coupled to mixer 504b. LO signals from corresponding LOs are coupled to mixers 504a-b. Note that with the configuration of FIG. 3, one of the LO signals may be LO3, so that LO1-LO2, LO1-LO3 or LO2-LO3 combinations may be applicable.

For a set of filter inputs (filter band), such as for the set of filter bands LB, MB, HB and HRB, a calibration procedure is utilized to calibrate the corresponding pair of receive signal paths by utilizing the self-calibration technique described below. As shown in FIG. 5, a calibration module 508 is used to place a driving signal 509 at an output node of one of the pair of receive signal paths. In the example shown in FIG. 5, the calibration drive signal is introduced at the output node of mixer 504b. When passive mixers are utilized for mixers 504a-b, a signal at an output of the mixer (with frequency fcal) is coupled back through the mixer (driven by a local oscillator signal with frequency LOx) to the input node of the mixer with a frequency conversion of fin=LOx±fcal. Hence, in the example, the driving signal (with frequency fcal) mixes with the LO signal (frequency LO2=LO1+Δf) to produce a calibration signal at the input node of mixer 504b (frequency fin=LO1+Δf±fcal).

A variety of driving signals 509 may be used at the input of mixer 504b to mix with the LO signal to generate the calibration signal at the operational signal input node of mixer 504b. In the example of FIG. 5, calibration module 508 places a DC offset (i.e. fcal=0 Hz) at the output node of mixer 504b as the driving signal. The DC offset at the output of the mixer generates the calibration signal at the input of the mixer with a frequency fin=LO1+Δf, provided the mixer is a passive mixer. The calibration signal is then coupled back up (e.g. back through) the signal path to the output node of LNAs 503.

Note that because the two pair of mixers use different LO frequencies, LO2 frequency may be regarded as the LO1 frequency plus a difference frequency (Δf, which can be a positive or negative frequency offset). That is LO2=LO1+Δf. Thus, the driving signal would be upconverted in frequency by the LO2 signal due the action of the mixer 504b.

A switch 510 (also designated S1) is open under normal operating conditions, but when in the calibration mode, switch 510 is closed. Calibration module may control the operation of switch 510 in some embodiments. Thus, when switch 510 is closed in the calibration mode, the calibration signal at the output node of LNAs 503 are coupled to the output node of LNAs 502. The calibration signal is then coupled to the input node of mixer 504a and processed by the second receive signal path of mixer 504a as though the calibration signal is a received signal. Essentially, the calibration signal is introduced in one of the pair of receive signal paths, fed back up (back through) the signal path, coupled over to the other of the corresponding signal path for the pair of signal paths and process the calibration signal as a received signal at the input node of mixer 504a. Note that, since LO2=LO1+Δf, mixing the calibration signal with LO1 results in Δf+the added tone to be generated at the output of mixer 504a, which may then be used to calibrate the remaining circuitry of the mixer 504a receive signal path. Thus, by selecting a particular frequency of LO2, LO1, and the driving signal, a calibration signal having a frequency of Δf (the difference between LO1 and LO2) plus the added time from the driving signal may be generated at the output node of mixer 504a.

Switch 510 is used in FIG. 5 to couple the calibration signal from the output node of LNAs 503 to the output node of LNAs 502. Other embodiments may utilize other components. For example, in one embodiment switch 510 is not used at all. Instead, the coupling of the calibration signal across the two LNA output nodes is achieved by parasitic (leakage) coupling. Other techniques may be used as well.

The calibration signal is used to calibrate various components, processes, routines, etc. in relation to processing a received carrier signal through the receive signal path of mixer 504a. Subsequently, the process may be repeated, where a calibration signal introduced at the input node of mixer 504a is fed back up the receive signal path, coupled across the LNA output nodes and used as input to mixer 504b to calibrate the signal path associated with mixer 504b.

Figure 6:
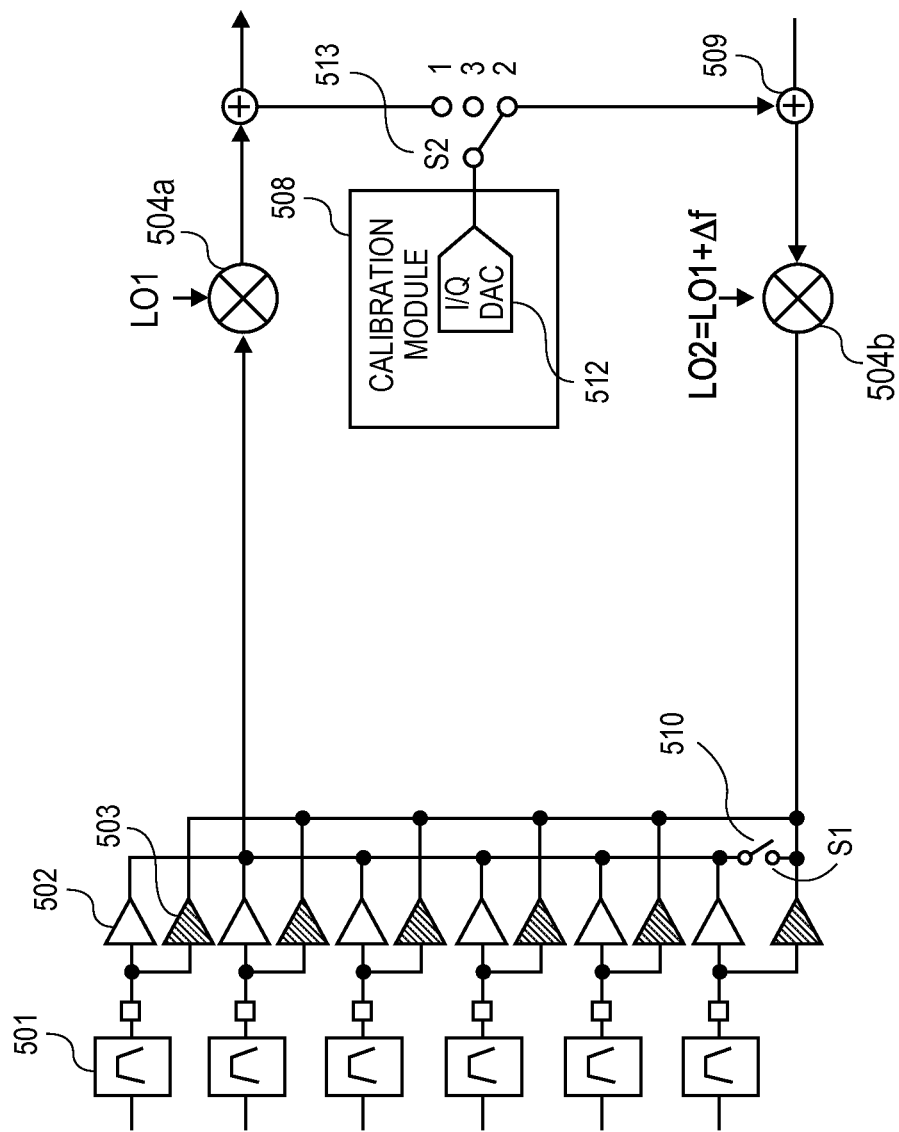
FIG. 6 shows a circuit diagram of an alternative example of introducing the calibration signal to the circuit shown in FIG. 5, in accordance with the present disclosure.

FIG. 6 shows a circuit diagram of an alternative example of introducing the calibration signal to the circuit shown in FIG. 5. In this example, calibration module 508 is coupled to switch 513 (also designated as S2). In normal operating mode, switch S2 is in position 3. When the receive path of mixer 504a is to be calibrated, S2 is placed in position 2, so that the driving signal 509 is introduced at the output node of mixer 504b. When the receive path of mixer 504b is to be calibrated, S2 is placed in position 1, so that the driving signal 509 is introduced at the output node of mixer 504a. Although a simple DC offset may be used for the driving signal as shown in FIG. 5, FIG. 6 shows the use of a DAC 512 to generate a variety of driving signals. In this way, the calibration signal may be a single tone (with frequency fcal), a plurality of tones or even a complex modulated signal that occupies a certain frequency bandwidth.

It is to be noted that various calibration procedures may be performed by the generated calibration signal. The DC offset of FIG. 5 generally generates a single tone with the one offset. However, the DAC arrangement of FIG. 6 allows programmable routines to be executed. Three examples of performing a calibration procedure with the more flexible system of FIG. 6 are noted in the below table.

| Calibration | LO2 = LO1 + Δf | DAC output signal (fcal) |
| --- | --- | --- |
| Analog filter (frequency response, group delay), IQ mismatch, gain steps of VGA | a) Fixed (Δf = const) b) swept (fmin ≤ Δf ≤ fmax) | a) Swept frequency fcal (single-tone CW) b) Constant DC (fcal = 0) |
| IIP2 | Δf = |frx − ftx| | Two-tone signal with frequencies fcal1 = f1 and fcal2 = f2 |

In calibrating an analog filter's frequency response, a) LO2 may be kept fixed while using the DAC to sweep to place a varying offset or b) sweep across frequencies using LO2, while the DC offset remains constant. Such techniques may be used to test, for example, the 3 dB frequency response point of the analog filter and adjust the trim capacitors to correct the 3 dB-point Similar techniques may be used to determine I and Q receive path response to determine the I and Q mismatch. Note that for each of the receive signal paths shown, there are actually two such mixers (with LO signals of the same frequency, but a 90 degrees phase shift). One for the I component and a second for the Q component. The calibration procedure would measure the I/Q imbalance for that receive signal path.

Another calibration procedure is to test for the $2^{nd}$ order Input Intercept Point (IIP2). In this instance, two tones are generated by the DAC to measure for the $2^{nd}$ order non-linearity metric. For FDD systems, the amplitude modulation component of the transmit signal sets the IIP2 requirement of the receiver. Therefore, the frequency offset Δf is chosen equal to the difference of the transmit frequency ftx and receive frequency frx, also known as the duplex spacing in. The difference |fcal1−fcal2| is smaller than the pass-band of the lowpass filter (e.g. filters 405 and 415 of FIG. 4).

Another calibration procedure is to perform gain step calibration of the variable gain amplifiers (e.g. amplifiers 406 and 416 of FIG. 4).

It is appreciated that other calibration routines may be performed as well. The calibration technique described herein may be utilized during all phases of device calibration, including calibration at the factory. However, the described calibration technique is well suited for calibration of the receiver during use. Because the calibration technique is based on the use of existing operational circuitry, minimal additional components and/or routines (e.g. calibration module) are needed. The calibration routine may be run as self-calibration at start-up or reset of the communication device, or during operational usage when signal reception problems are encountered by the receiver.

As may be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level.

As may also be used herein, the terms "processing module", "processing circuit", "processor", "processing unit", "baseband processor", "signal processor" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The term "module", "assembly", or "stage" is used in the description of one or more of the embodiments. Such terms may be applicable to a circuit, part of a circuit or grouping of circuits that provide a particular function.

The one or more embodiments are used herein to illustrate one or more aspects, one or more features, one or more concepts, and/or one or more examples that may be implemented. While particular combinations of various functions and features of the one or more embodiments have been expressly described herein, other combinations of these features and functions are likewise possible. The disclosure is not limited by the particular examples disclosed herein and expressly incorporates other combinations as well.

What is claimed is:

1. A method of calibrating a wireless communication receiver that includes a plurality of receive signal paths to process a plurality of carriers, in which respective receive signal paths include respective mixers, filters and baseband processing, the method of calibrating comprising:
   generating a calibration signal at an input node of a first mixer that is used in a first receive signal path to receive and mix a first carrier of the plurality of carriers, in which the first mixer is configured to operate with a first local oscillator signal having a first local oscillator frequency to mix the first carrier with the first local oscillator signal;
   coupling the calibration signal back up the first receive signal path to an output node of a first low noise amplifier (LNA) in the first receive signal path;
   coupling the calibration signal from the output node of the first LNA to an output node of a second LNA in a second receive signal path, wherein the second receive signal path has a second mixer configured to mix a second carrier of the plurality of carriers with a second local oscillator signal having a second local oscillator frequency and wherein the first local oscillator signal is different in frequency from the second local oscillator signal;

mixing the calibration signal with the second local oscillator signal in the second mixer to generate a down-converted calibration signal at an output node of the second mixer in the second receive signal path; and utilizing the down-converted calibration signal to perform at least one calibration procedure on the wireless communication receiver.

2. The method of claim 1, further including generating the calibration signal by applying an offset voltage at an output node of the first mixer to generate a tone signal on the first local oscillator signal to generate the calibration signal at the input node of the first mixer.

3. The method of claim 1, further including generating the calibration signal by applying a programmed signal at an output node of the first mixer to generate a tone, multiple tones or a modulated signal on the first local oscillator signal to generate the calibration signal at the input node of the first mixer.

4. The method of claim 1, wherein the coupling of the calibration signal from the output node of the first LNA to the output node of the second LNA in the second receive signal path is achieved by leakage coupling when the calibration signal is applied during a calibration mode.

5. The method of claim 1, wherein the coupling of the calibration signal from the output node of the first LNA to the output node of the second LNA in the second receive signal path is achieved by closing a switch between the two LNA output nodes when the calibration signal is applied during a calibration mode.

6. The method of claim 1, wherein the at least one calibration procedure is performed as a start-up procedure of the wireless communication receiver or during operation of the wireless communication receiver.

7. The method of claim 1, wherein the at least one calibration procedure is performed to calibrate a frequency response of an analog filter in the second receive signal path.

8. The method of claim 1, wherein the at least one calibration procedure is performed to calibrate a mismatch between an in-phase (I) component and a quadrature (Q) component in the second receive signal path for I and Q components.

9. The method of claim 1, wherein the at least one calibration procedure is performed to calibrate a second order input intercept point (IIP2) for the second receive signal path.

10. The method of claim 1, wherein the at least one calibration procedure is performed to calibrate gain step mismatch in the second receive signal path.

11. A method of calibrating a wireless communication receiver that includes a plurality of receive signal paths to support reception of a plurality of carriers for carrier aggregation in which a first carrier of the plurality of carriers is received via a first receive signal path and a second carrier of the plurality of carriers is received via a second receive signal path, and in which respective receive signal paths include respective low noise amplifiers (LNAs), mixers, filters and digital processing, the method of calibrating comprising:

driving an output node of a first mixer to generate a calibration signal at an input node of the first mixer, wherein the first mixer is used in a first receive signal path to receive and mix the first carrier for carrier aggregation, in which the first mixer is configured to operate with a first local oscillator signal having a first local oscillator frequency to mix the first carrier with the first local oscillator signal, the first mixer being a passive mixer;

coupling the calibration signal back up the first receive signal path to an output node of a first LNA in the first receive signal path;

coupling the calibration signal from the output node of the first LNA to an output node of a second LNA in a second receive signal path, wherein the second receive signal path has a second mixer configured to mix the second carrier with a second local oscillator signal having a second local oscillator frequency and wherein the first local oscillator signal is different in frequency from the second local oscillator signal, the second mixer being a passive mixer;

mixing the calibration signal with the second local oscillator signal in the second mixer to generate a down-converted calibration signal, the down-converted calibration signal having a frequency that is a difference between the first and second local oscillator frequencies, at an output node of the second mixer in the second receive signal path; and utilizing the down-converted calibration signal to perform at least one calibration procedure on the wireless communication receiver.

12. The method of claim 11, wherein the at least one calibration procedure is performed to calibrate a frequency response of an analog filter in the second receive signal path.

13. The method of claim 11, wherein the at least one calibration procedure is performed to calibrate a mismatch between an in-phase (I) component and a quadrature (Q) component in the second receive signal path for I and Q components.

14. The method of claim 11, wherein the at least one calibration procedure is performed to calibrate a second order input intercept point (IIP2) for the second receive signal path.

15. The method of claim 11, wherein the at least one calibration procedure is performed to calibrate gain step mismatch in the second receive signal path.

16. An apparatus configured to calibrate a receive signal path for a wireless communication receiver that includes a plurality of receive signal paths to process a plurality of carriers, the apparatus comprising:

a first receive signal path that includes a first low noise amplifier (LNA), a first passive mixer, a first local oscillator and a first filter, wherein a first carrier of the plurality of carriers is amplified by the first LNA, mixed with a first local oscillator signal from the first local oscillator and having a first local oscillator frequency, and a recovered first signal at an output node of the first passive mixer is filtered by the first filter for signal processing;

a second receive signal path that includes a second low noise amplifier (LNA), a second passive mixer, a second local oscillator and a second filter, wherein a second carrier of the plurality of carriers is amplified by the second LNA, mixed with a second local oscillator signal from the second local oscillator and having a second local oscillator frequency, and a recovered second signal at an output node of the second passive mixer after down-conversion is filtered by the second filter for signal processing; and a calibration module configured to generate a driving signal at the output node of the first passive mixer for generating a calibration signal at an input node of the first passive mixer and configured to transmit the calibration signal back up the first receive signal path to an output node of the first LNA in the first receive signal path, couple the calibration signal from the output node of the first LNA to an output node of the second LNA in the second receive signal path, wherein the calibration signal is mixed with the second local oscillator signal in the second passive mixer to generate a down-converted calibration signal at an output node of the second passive mixer in the second receive signal path for use of the down-converted calibration signal to perform at least one calibration procedure on the wireless communication receiver.

17. The apparatus of claim 16, wherein the calibration module is configured to apply an offset voltage at the output node of the first passive mixer as the driving signal to generate a tone signal on the first local oscillator signal as the calibration signal.

18. The apparatus of claim 16, wherein the calibration module is configured to apply a programmed signal at the output node of the first passive mixer as the driving signal to generate a tone, multiple tones or a modulated signal as the calibration signal.

19. The apparatus of claim 16, wherein the coupling of the calibration signal from the output node of the first LNA to the output node of the second LNA in the second receive signal path is achieved by leakage coupling when the calibration signal is applied during a calibration mode.

20. The apparatus of claim 16, wherein the coupling of the calibration signal from the output node of the first LNA to the output node of the second LNA in the second receive signal path is achieved by closing a switch between the two LNA output nodes when the calibration signal is applied during a calibration mode.

* * * * *